United States Patent [19]

De Coene et al.

[11] 4,259,035
[45] Mar. 31, 1981

[54] AGRICULTURAL BALE ACCUMULATOR

[75] Inventors: Frans J. G. C. De Coene; Marc G. Vansteelant, both of Zedelgem, Belgium

[73] Assignee: Sperry Corporation, New Holland, Pa.

[21] Appl. No.: 941,831

[22] Filed: Sep. 11, 1978

[30] Foreign Application Priority Data

Sep. 13, 1977 [GB] United Kingdom ............ 38193/77

[51] Int. Cl.³ ................. A01D 87/12; B65G 57/28; B65G 57/32
[52] U.S. Cl. ........................................ 414/38; 414/44
[58] Field of Search ................ 414/38, 39, 40, 44, 414/46, 111, 492

[56] References Cited

U.S. PATENT DOCUMENTS

| | | | |
|---|---|---|---|
| 2,848,127 | 8/1958 | Grey | 414/39 |
| 3,139,196 | 6/1964 | Legocki | 414/111 |
| 3,402,832 | 9/1968 | Wehde | 414/44 |
| 3,486,636 | 12/1969 | Stroup | 414/44 |
| 3,510,013 | 5/1970 | Best | 414/44 |
| 3,517,832 | 6/1970 | Zieschang | 414/38 |
| 3,942,651 | 3/1976 | Neely | 414/40 |
| 4,119,218 | 10/1978 | Guenon et al. | 414/39 |

FOREIGN PATENT DOCUMENTS 7524775  5/1976  Fed. Rep. of Germany ............ 414/44

*Primary Examiner*—Leslie J. Paperner
*Attorney, Agent, or Firm*—Frank A. Seemar; James R. Bell; Larry W. Miller

[57] ABSTRACT

The invention provides a simple, and hence relatively inexpensive, bale accumulator for use in small and medium farming operations and which will reduce much of the present laborious and time-consuming manual bale-handling.

The bale accumulator comprises a load bed (6), a load table (20) pivotally mounted to one side of the load bed (6) and movable between a horizontal bale-receiving position transverse of the load bed and an upright bale-discharge position for depositing a row of bales on the load bed (6), and bale pick-up means (25) located forwardly of the load table (2) adjacent the pivotal mounting thereof for picking up bales from the ground and depositing the bales one after the other on the load table (20) for forming a row of bales thereon.

26 Claims, 20 Drawing Figures

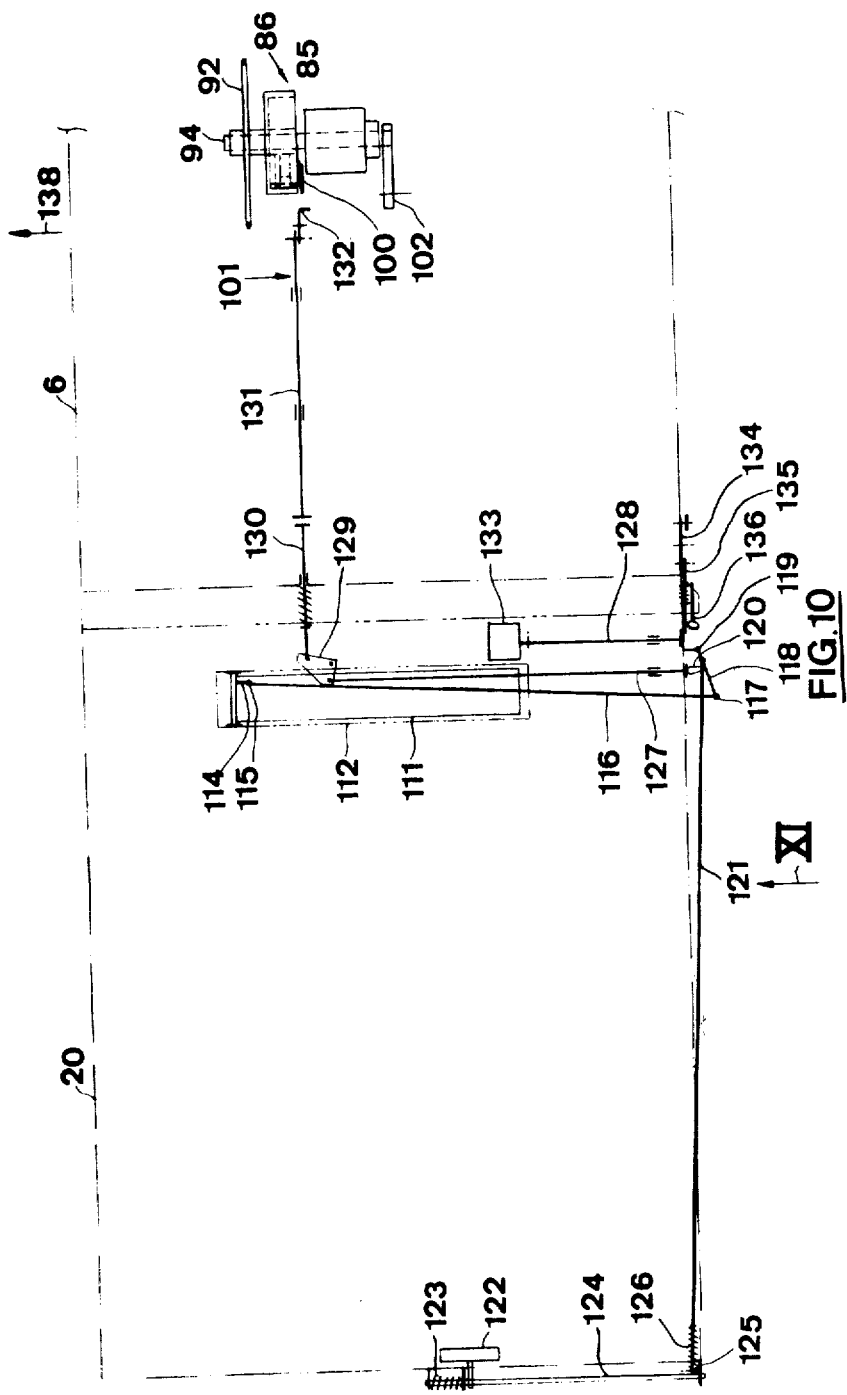

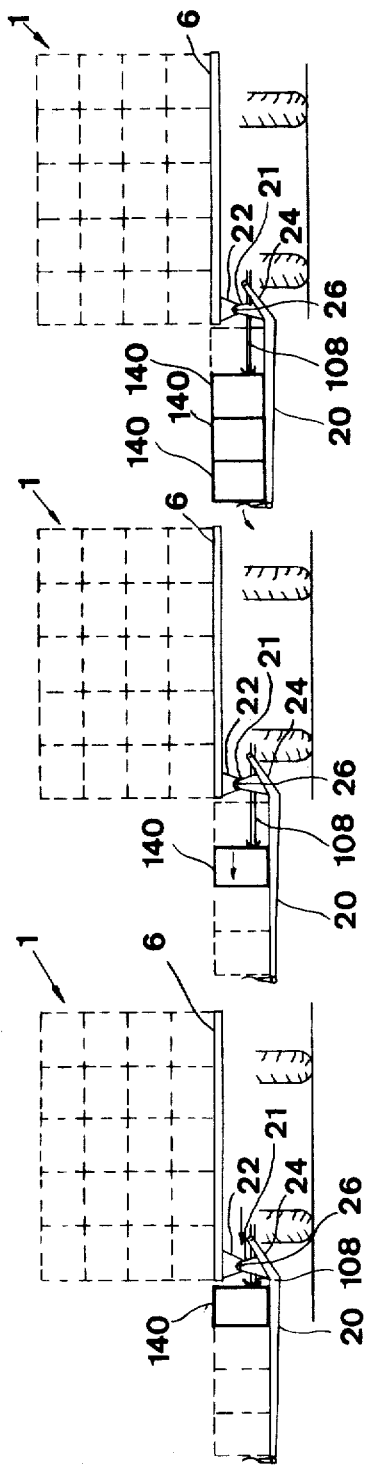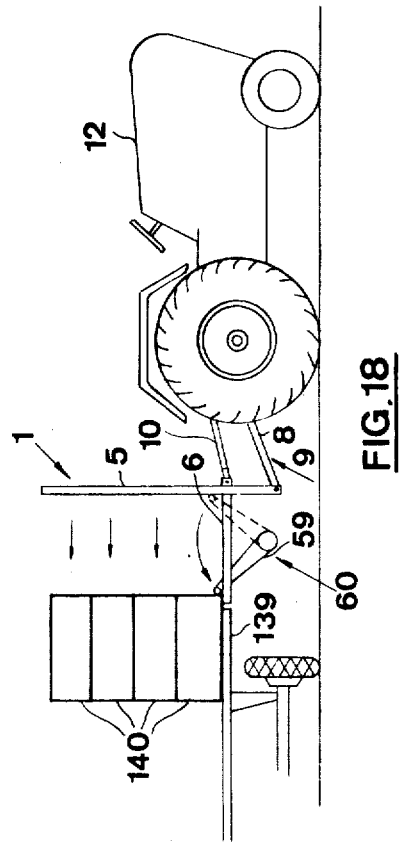

AGRICULTURAL BALE ACCUMULATOR

BACKGROUND OF THE INVENTION

This invention relates to a mechanism for accumulating individual bales of hay or the like from a field where they have been randomly deposited by a baler, building them into compact stacks, and depositing the stacks so formed on a load bed of a trailer or the like for subsequent transport and/or subsequent mechanized handling operations.

Loading and stacking of bales by hand on a trailer or truck is a time-consuming, laborious task and necessitates at least two or three persons to accomplish the loading job and to drive the vehicle involved, be it a towing vehicle for a trailer or the actual truck. Also, it is often necessary that the trailer and truck be stopped at the location of each bale in the field to enable loading thereof. For convenience, the term "wagon" will be used to cover both a trailer and a truck.

Bale pick-up and lifter mechanisms are already known for mounting on, or being pulled alongside, a wagon for picking up bales laying in the field and for lifting the bales above the level of the load bed as the wagon is moved across the field. The stacking of the bales on the load bed still has to be accomplished manually.

Other devices are also known for towing behind a baler to accumulate a group of bales and deposit them in the field for subsequent loading onto a wagon. However, such devices quite often seriously decrease the effective capacity of the baler. This is due, for example, to the fact that the baler and accumulator have to be slowed down at the moment of depositing a stack of bales onto the ground. If this were not done, it could happen that the stack disintegrates. Furthermore, any breakdown of the accumulator results in a delay in the baling operation. Also, quite often the baler with the accumulator therebehind are pulled across the field at a lower speed than the normal or optimum baler speed and this towing operation may damage the baler, as normally the baler is not designed for pulling an additional load. The bale accumulator normally requires a connection to a power source and as the accumulator is pulled behind the baler on the one hand, and as the baler normally has no rear PTO, a lengthy power line has to be provided between the pulling tractor forwardly of the baler and the accumulator. This tends to necessitate a hydraulic power system for the accumulator which is relatively expensive.

The stacks formed by known accumulators are always limited to only two bales as regards height, which means that the stacks comprise a limited number of bales, thereby increasing the time taken for subsequent loading on a wagon. Moreover, the subsequent loading operation still requires additional specialized equipment and manpower. Also, as bales stacked with an accumulator of the type described above are rarely ideally arranged for fast mechanized loading onto a wagon, the bales either have to be restacked onto the wagon by hand, or another piece of specialized loading equipment employed.

Pull-type accumulators of the type referred to above have been disclosed in U.S. Pat. Nos. 3,139,196 and 3,402,832.

There are also sophisticated, fully automated bale wagons on the market which make the bale loading, stacking and transportation operations a one-man job. Bales are automatically lifted from the ground and arranged in rows. Predetermined numbers of rows of bales are automatically arranged in a layer and successive layers automatically stacked on a load bed to form an orderly arranged stack. The so formed stack often comprises more than one hundred bales and may be unloaded either all at once or bale-by-bale for storage. Such a piece of sophisticated equipment, however, is only economical for a large farm. A fully automated bale wagon of the type described above is shown in U.S. Pat. No. 2,848,127.

A similar bale wagon is shown in U.S. Pat. No. 3,517,832 and comprises a sidewardly pivotable load table having bale pick-up means arranged at the forward end thereof. When picking up and depositing bales on the load table of the wagon, the load table necessarily has to be positioned closely adjacent the ground surface so that it may contact the ground from time to time. Furthermore, bales are not positively picked up from the ground and positioned on the load table, whereby bale feeding problems may occur. Also in one arrangement, and dependent on the number of bales already positioned on the load table, subsequent bales have to be picked up at different spacings relative to the load table. This makes the driving of the machine relatively complicated. In another arrangement, all bales are picked up at the outermost end of the load table, whereby drive means have to be provided over the full width of the wagon and of the load table.

Finally, less sophisticated tractor-mounted bale accumulators are known which require less investment and which, therefore, are more appropriate to the small and medium size farms. Such bale accumulators comprise a lifting device for lifting bales from the ground and for feeding them from below into a stacking chamber. Bale-retainer means are provided at the bottom end of the stacking chamber and allow the passage of bales from below in an upward direction, but hold the bales received in the stacking chamber in a raised position once they have been placed in the chamber. Once the stacking chamber is full, other transfer means become operative to transfer the stack of bales towards the wagon load bed in a sideward direction.

This method of operation, especially the method of stacking bales from below and in an upward direction in an upright bale stacking chamber, can give rise to bale-feeding problems. Indeed, it quite often occurs that the bales produced by a given baler are of varying lengths or are tied rather loosely. In both cases feeding problems may occur, and when the bales are loosely tied or when shorter bales have been produced, the bale-retainer means in the bale stacking chamber occasionally may fail to retain in the proper position bales fed into the chamber. When oversize bales are encountered, difficulties may arise in feeding them into the stacking chamber. Thus for the machine to operate properly, all bales should be of a predetermined length and tied firmly but this is virtually impossible to achieve. Furthermore, accumulators of the types described above are relatively complicated and rather expensive. Also, as the stacking chamber is located either above or rearwardly of the bale pick-up means, the stacking chamber is thus positioned at one end of the machine and entirely outside the width of the tractor, even when the machine is in a transport position. Bale accumulators of this type are disclosed in the U.S. Pat. No. 3,486,636 and in the German Utility Model No. 75.24.775.

SUMMARY OF THE INVENTION

It is an object of the present invention to overcome or alleviate one or more of the foregoing disadvantages of known bale accumulators. More especially, it is an object to provide a bale accumulator which may be of the tractor-mounted type and which is simple in construction, and hence relatively cheap to manufacture, so as to suit the small and medium size farming operations.

According to the present invention, a bale accumulator comprises a load bed, a load table pivotally mounted to one side of the load bed and movable between a horizontal bale-receiving position transverse of the load bed and an upright bale-discharge position for depositing a row of bales on the load bed, and bale pick-up means located forwardly of the load table adjacent the pivotal mounting thereof for picking up bales from the ground and depositing the bales one after the other on the load table for forming a row of bales thereon.

Preferably, the bale accumulator is of the tractor-mounted type and the load table, when in the bale-receiving position, is positioned at a substantial height above the ground, the gap between the ground and load table being bridged by the pick-up means. Preferably, first bale transfer means are provided for moving bales received on the load table in a direction transversely away from the load bed. These bale transfer means may comprise a plunger driven by a mechanical one-revolution coupling or clutch mechanism which may be operated by control means provided on the load table at the bale-receiving end thereof and actuated by a bale received from the pick-up means to operate the one-revolution clutch mechanism, whereby the plunger is driven to push the bale just received on the load table in a transverse direction away from the load bed. Further control means may be provided to engage drive means for pivoting the load table to the bale-discharge position when a full row of bales has been formed on the load table, so as to deposit the row of bales on the load bed.

A movable rack may be mounted on the load bed for holding the rows of bales placed thereon in an upright position. The rolling rack is resiliently held in position in a manner so that it will be moved in a transverse direction to the side of the load bed opposite to the load table over a distance corresponding to the depth of one bale when a row or a further row of bales is placed on the load bed. Bale-retainer means may be provided above the load bed at the location of the upper bale in a row deposited by the load table. These bale-retainer means are operable to exert a downward pressure on the top of the last row of bales placed on the load bed.

Preferably the pick-up means is an independent structure which is floatingly mounted adjacent its rear end to the load bed in a manner so as to allow pivotal movement around a first axis extending transverse to the direction of operative travel of the accumulator and around a second axis extending generally in the direction of operative travel. The pick-up means may also be arranged to slide at its forward end over the ground surface so that the pick-up can follow the ground contour during the bale pick-up operation.

The bale accumulator may further comprise second bale transfer means on the load bed which are movable from a forwardmost rest position in a rearward direction for discharging a stack of bales formed on the load bed.

BRIEF DESCRIPTION OF THE DRAWINGS

A bale accumulator in accordance with the invention will now be described in greater detail, by way of example, with reference to the accompanying drawings, in which:

FIG. 10 is a partial schematic top view illustrating various control means, FIGS. 14–18 show schematically various steps in the operation of the bale accumulator.

DESCRIPTION OF THE PREFERRED EMBODIMENT

Figure 1:
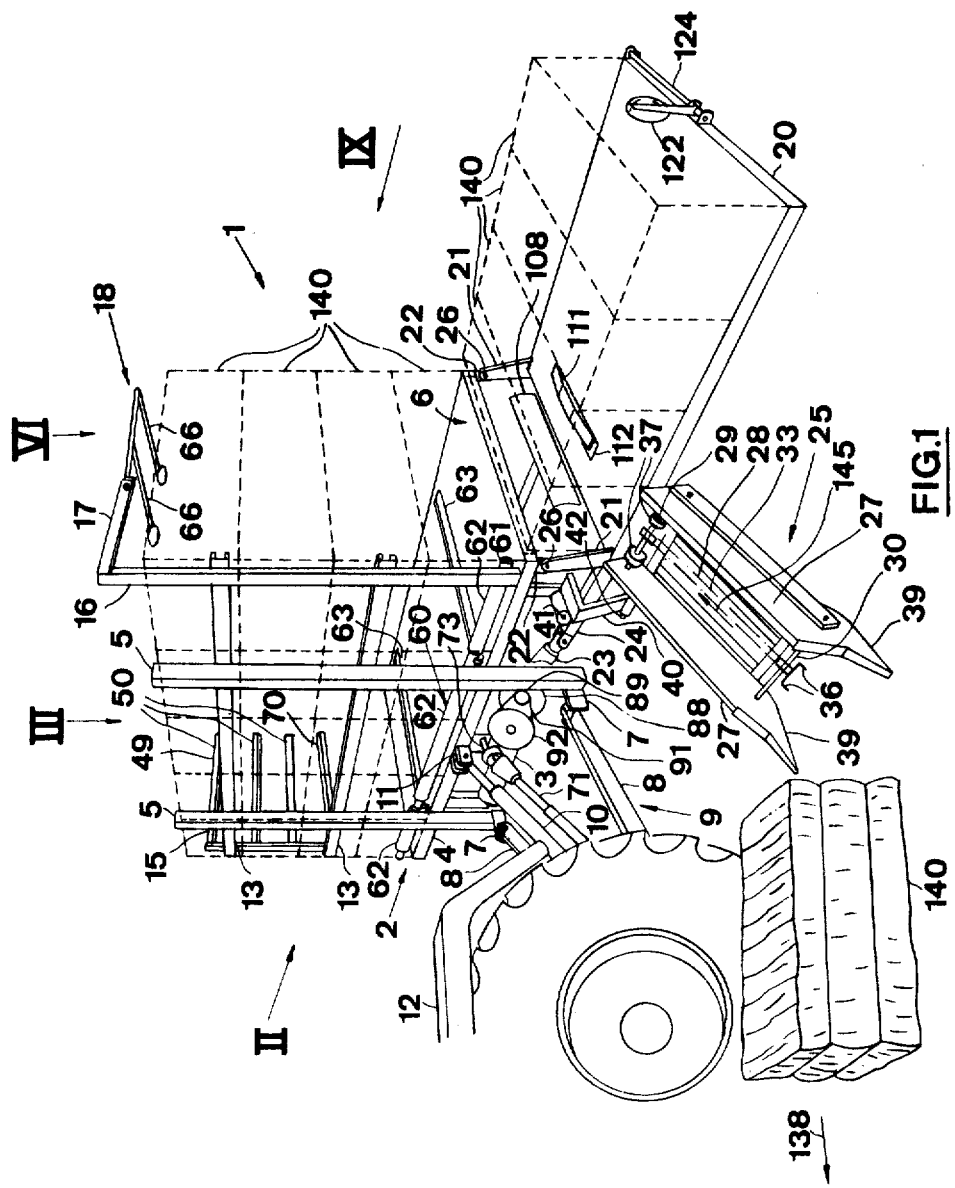
FIG. 1 is a schematic perspective view of the bale accumulator.

Reference to left-hand and right-hand side of the machine, and to forward and rearward, are determined with respect to the direction of operative travel of the machine in the field.

Referring principally to FIGS. 1 to 7, the bale accumulator is indicated generally at 1 and comprises a framework and includes a main lower and horizontal beam 3, a load bed frame 4 connected thereto and a pair of upright beams 5. The upright beams 5 project from below the load bed surface 6 to the top of the machine and are spaced apart in a transverse direction. The upright beams 5 support, adjacent their lower ends, fixation means 7 for the lower links 8 of a tractor three point hitch, generally indicated at 9. The upper link 10 of the three point hitch 9 is attachable to fixation means 11 at the centre of the forward edge of the load bed frame 4 and inbetween the beams 5. The bale accumulator 1 may thus be raised and lowered relative to the ground and relative to the tractor 12 (shown only partially in FIG. 1) by means of the tractor hydraulics (not shown).

Two transverse beams 13 are secured at vertically spaced locations to the upright beams 5 and have a width generally corresponding to the width of the load bed surface 6. The transverse beams 13 are arranged to receive guide rollers 14 (FIG. 2) of a rolling load rack 15, the details of which will be described hereinafter. A further upright beam 16 is secured to the transverse beams 13 at the left-hand ends thereof and supports at its top end an arm 17 projecting in a transverse direction to te left of the machine and supporting bale-retainer means 18. Reinforcing links 19 (FIG. 2) extend between the lower ends of the upright beams 5 and the main horizontal beam 3.

A load table, generally indicated at 20, is pivotally mounted by a pair of pivot arms 21 at the inner end of the table on pivot brackets 22 provided on the left-hand end of the load bed framework through pivot pins 26. A hydraulic cylinder 23 extends between the load bed framework 4 and an arm 24 rigidly mounted to the load table 20 for controlling the position of the load table 20 relative to the load bed 6. When in a bale-discharge or transport position, the load table 20 takes a generally upright position, as is best shown in FIGS. 9-12 and 17. When in a bale-receiving position, the load table 20 is positioned generally horizontally to one side of the load bed 6 and at a substantial height above the ground surface. Nevertheless, the load table 20 is positioned below the level of the load bed 6 in the bale-receiving position. The load table 20 has a width generally corresponding to the height of the stack of bales to be formed by the accumulator. The dimension of the table 20 in a fore-and-aft direction of the machine, generally corresponds to the average length of a conventional rectangular hay bale.

Bale-pick-up means, generally indicated at 25, are provided at a location forwardly of the innermost end portion of the load table 20, i.e. to the left of, and adjacent, the load table pivot 26. The pick-up means 25 comprise a pair of transversely-spaced side walls 27 and an endless member 28 located therebetween and extending around an upper drive shaft 29 and a lower driven shaft 30. The upper drive shaft 29 receives driving power via a detachable telescopic universal joint shaft 31 (FIG. 3) which itself receives power from a gearbox 32 to be described. The endless member 28 is formed by an endless chain 33 which extends around sprockets 34 and 35 on the driving and driven shafts 29 and 30 respectively, a number of links of the chain supporting, at regular intervals, bale-pick-up and bale-retainer fingers 36. The upper shaft 29 carries a pair of bale transfer drums 37 on either side of the chain 33. The diameter of the drums 37 exceeds the diameter of the driving sprocket 34 on the shaft 29 and each drum comprises a plurality of ribs 38 fixed to side discs 48 which themselves are secured on the shaft 29 (FIG. 5) and which are spaced around the periphery of the drum and extending radially of the shaft 29 although spaced therefrom. The pick-up side walls 27 are formed at their forward and lowermost ends with skids 39 for sliding over the ground surface during operation. The pick-up means 25 are pivotally supported on the load bed framework 4 for universal movement via an angled support 40 which at one end is pivoted on a fore-and-aft extending pivot shaft 41 on the load bed framework 4, and at the other end is pivoted on a transversely-extending pivot shaft 42 on the pick-up means 25. Thus the pick-up means 25 may pivot in a plane transverse to the direction of operative travel (about pivot 41) as well as in a plane in the direction of operative travel (pivot 42).

Figure 9:
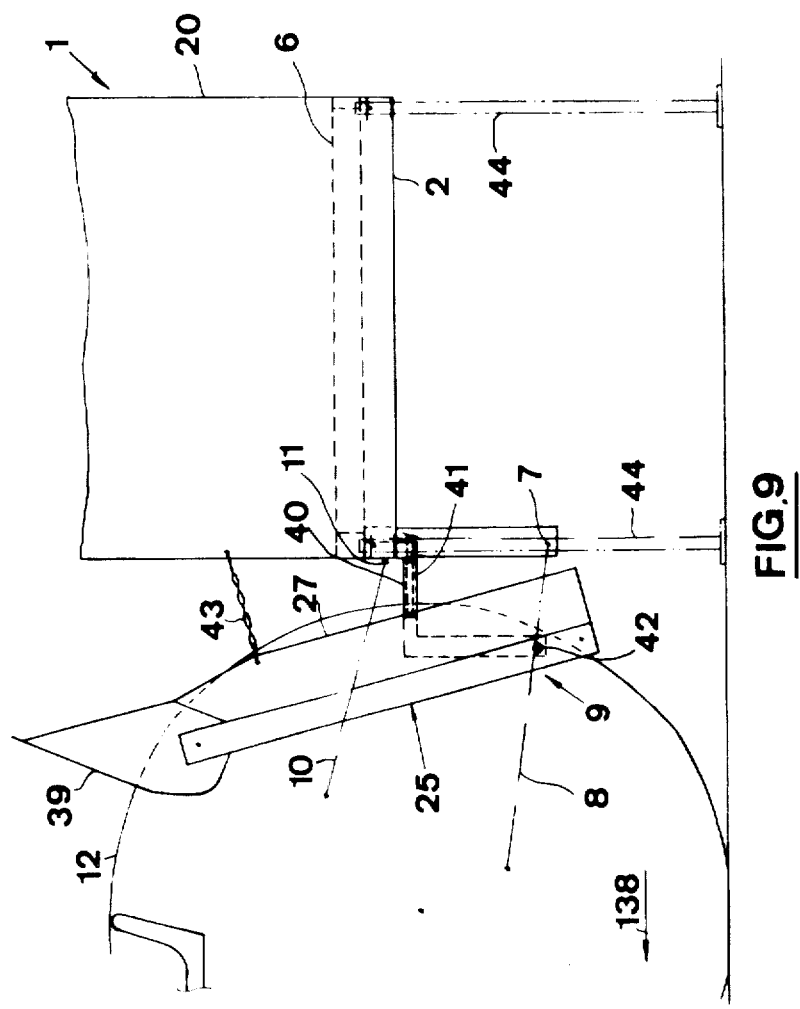
FIG. 9 is a schematic side view taken in the direction of arrow IX in FIG. 1 with certain components in different positions.

For transport purposes, the pick-up means 25 may be lifted to a raised position, as is shown in FIG. 9, by pivoting it around the transverse pivot shaft 42, it being held in this position by a suspension chain 43 extending between the pick-up means 25 and the upright beam 16 of the load bed 6. Telescopic supports 44 are provided for supporting the bale accumulator 1 on the ground when detached from the tractor for storage.

Figure 2:
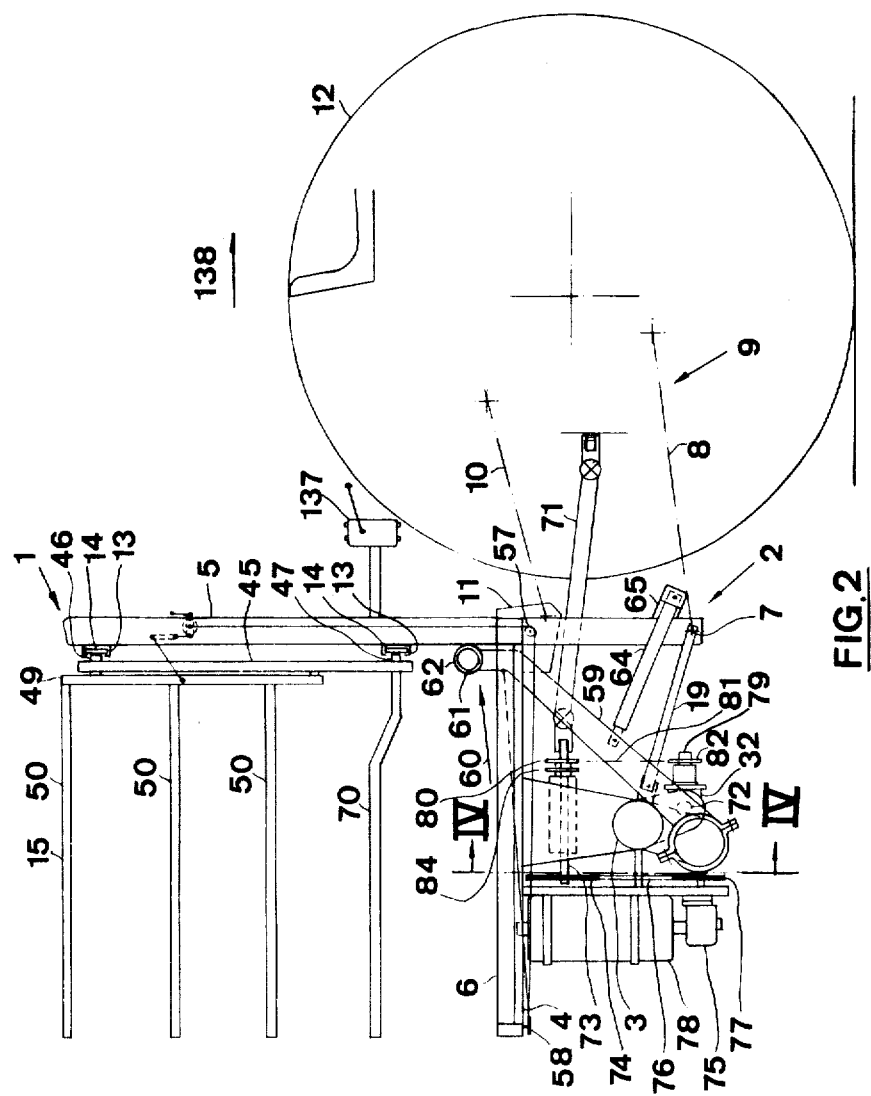
FIG. 2 is a schematic side view, to a larger scale, taken in the direction of arrow II in FIG. 1.
Figure 3:
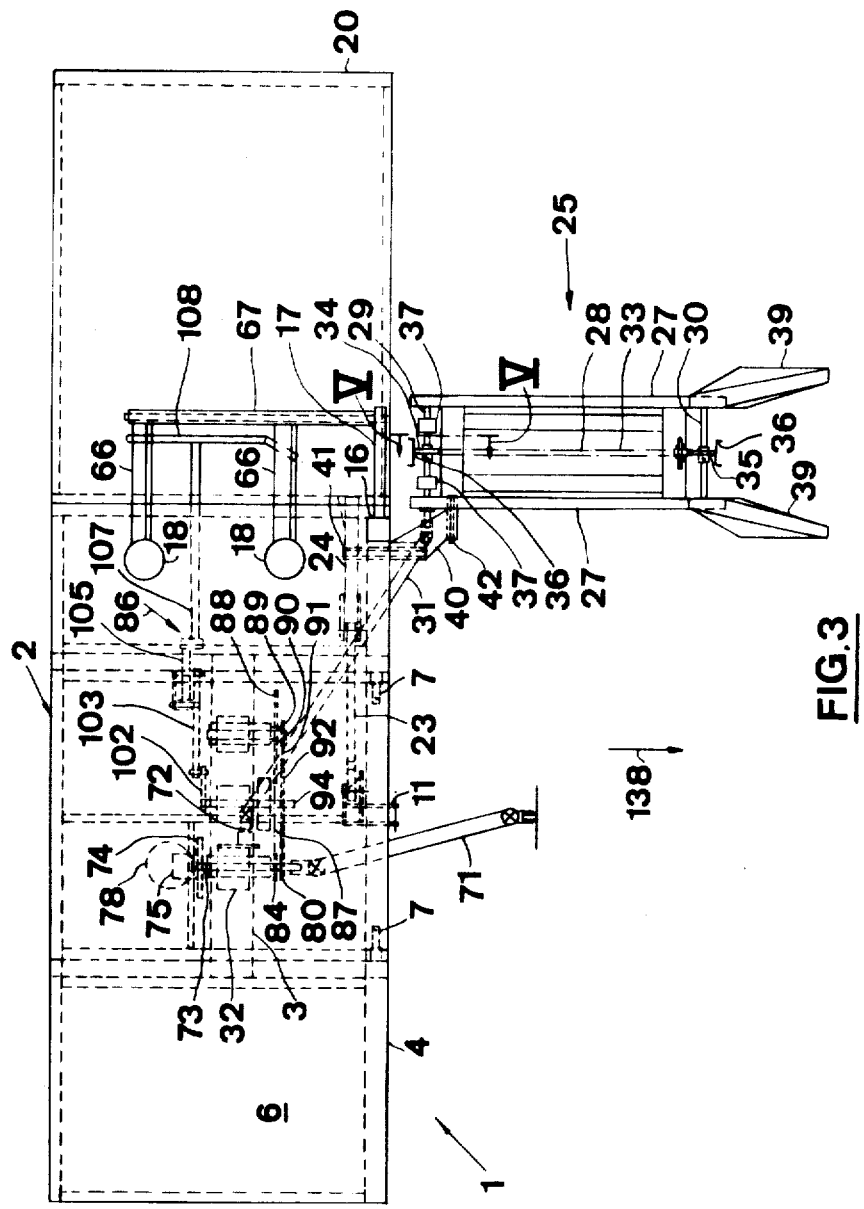
FIG. 3 is a schematic top view taken in the direction of arrow III in FIG. 1.

The load rack mentioned above and generally indicated at 15, comprises an upright beam 45 with upper and lower transversely-projecting arms 46 and 47 respectively, fixed thereto. The arms 46 and 47 both support a pair of rollers 14 which are guided in the hollow transverse beams 13. A bale-retainer frame 49, comprising a plurality of rearwardly-projecting retainer arms 50, is mounted on the upright beam 45 which further supports an additional rearwardly-projecting retainer arm 70 adjacent its lower end. This retainer arm 70 is specially shaped, as best seen in FIG. 2, to avoid interference with a stack push-off mechanism 60 to be described.

The inclination in the transverse direction of the bale-retainer frame 49 is adjustable over a limited range. A cable 51 (FIG. 12) is connected at one end to the load rack 15 and extends therefrom towards the left around a reversing roller 52 on the further upright beam 16, and then towards the righthand side, around a second reversing roller 53. The cable 51 projects towards the left from the second reversing roller 53 and is coupled at its other end to the further upright beam 16. The second reversing roller 53 is attached to one end of a coil spring 54, the other end of which is coupled to a further cable 55 which extends around reversing rollers 56, 57 and 58 and is coupled at the other end to an arm 59 of the stack push-off mechanism 60 in a manner such that the spring tension is released when the push-off mechanism 60 is actuated.

Figure 12:
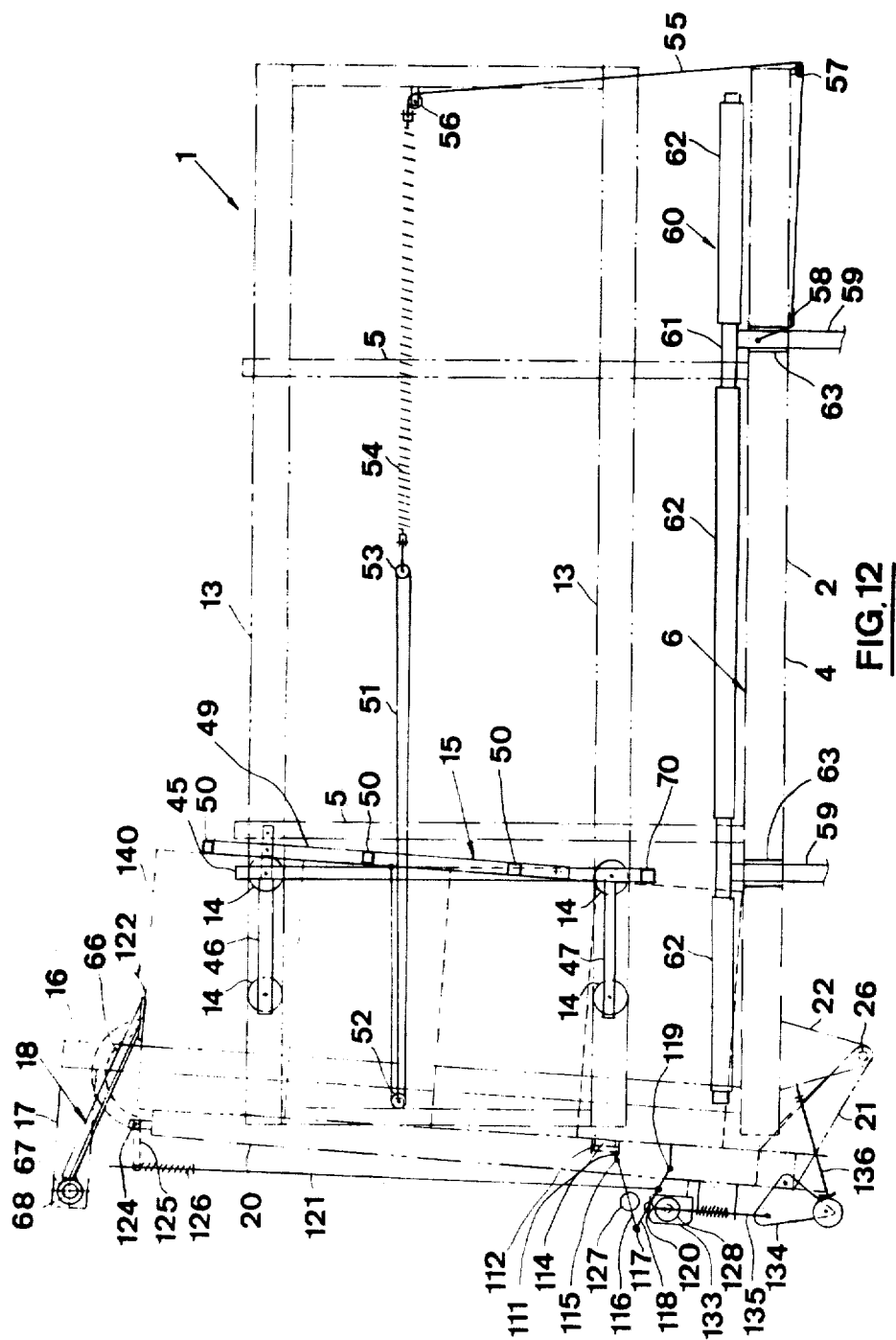
FIG. 12 is a view similar to FIG. 11 but with the components in a different operative position.

Still referring to FIG. 12, the bale stack push-off mechanism 60 comprises an upper transverse push-off bar 61 with rollers 62 mounted thereon and positioned above the load bed surface 6. The push-off bar 61 is mounted on a pair of pivot arms 59 which extend through apertures 63 in the load bed surface 6 and which are pivotally mounted on the main beam 3. Hydraulic cylinders 64 (FIG. 2) are arranged between the arms 59 and supports 65 on the lower ends of the upright beams 5. The push-off bar 61 moves along an arcuate path from the forwardmost rest position to a position adjacent the rear edge of the load bed surface 6 when actuated.

The bale-retainer means 18 at the top end of the further upright beam 16 comprise a pair of bale-retainer arms 66 projecting in a transverse direction towards the right-hand side of the load bed 6. The bale-retainer arms 66 are attached to a bushing 67 (FIG. 6) which is pivotally mounted on a fore-and-aft projecting shaft 68 which itself is secured to the arm 17. A coil spring 69 acting between the bushing 67 and the arm 17 tends to pivot the bushing 67 so that the bale retainer arms 66 are urged downwardly.

Power from the tractor 12 is supplied to the bale accumulator 1 via a telescopic universal joint shaft 71 (FIG. 2) which is coupled at one end to the tractor PTO and at the other end to an intermediate shaft 73. The intermediate shaft 73 supports a pulley 74 for driving a hydraulic pump 75 via a V-belt 76 and a pulley 77 on the pump input shaft. A hydraulic fluid reservoir 78 is positioned above the pump 75 and below the load bed surface 6. A sprocket 80 on the intermediate shaft 73 is arranged to drive an input shaft 79 of the above-mentioned gearbox 32 via a chain 81 and a further sprocket 82 on the gearbox input shaft 79. The universal joint shaft 31 mentioned above and operable to drive the pick-up means 25 is coupled to an output shaft 72 on the gearbox 32. A further sprocket 84 on the intermediate shaft 73 is arranged to drive the outer portion 85 of a one-revolution coupling or clutch device 86 through a speed reduction transmission comprising a chain 87, a pair of sprockets 88 and 89 on a further intermediate shaft 90, a further chain 91, and a sprocket 92 on the outer portion 85 of the coupling device 86.

Figure 7:
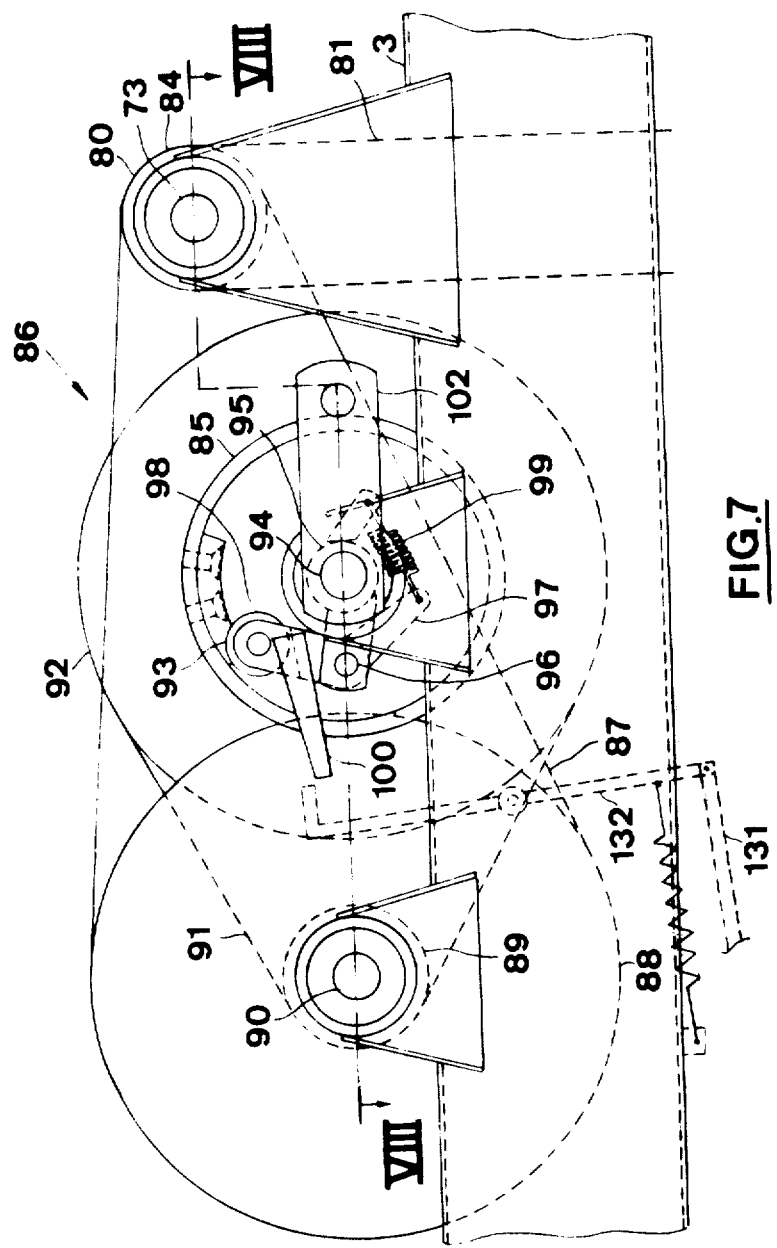
FIG. 7 is a partial view, on a larger scale, of the section indicated at VII in FIG. 4, and with the components thereof in a different position.
Figure 8:
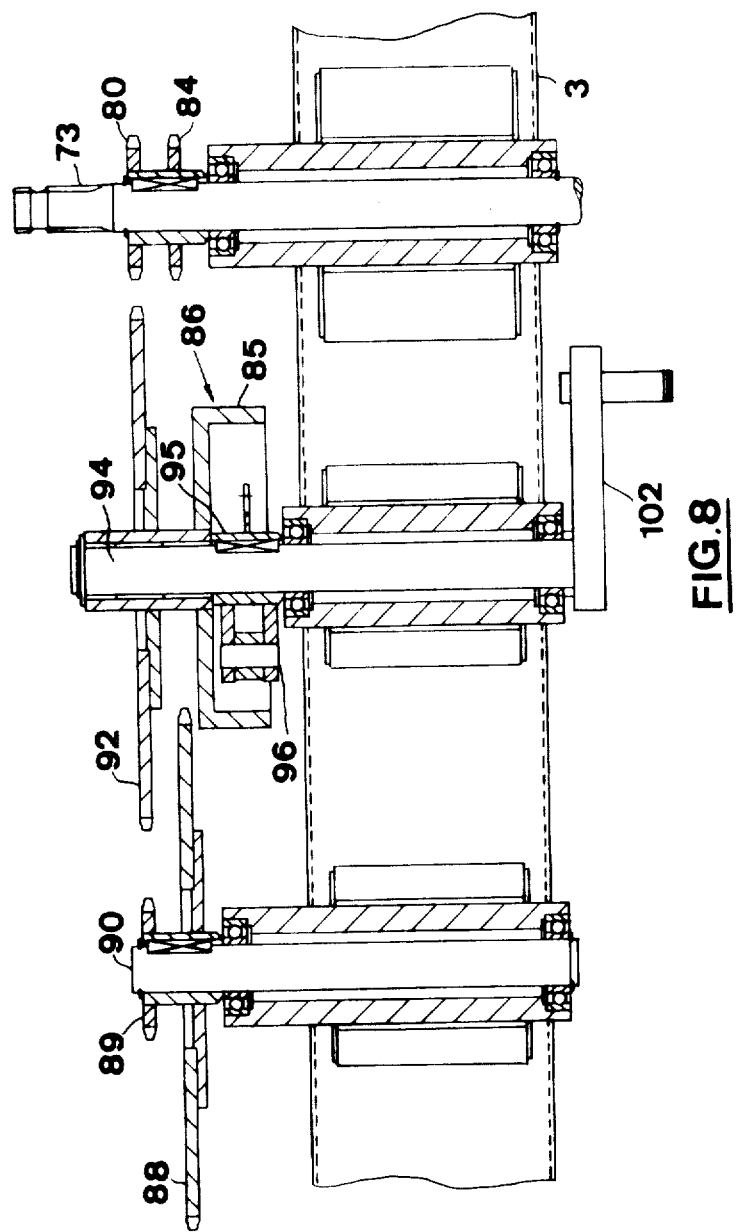
FIG. 8 is a sectional view on the line VIII—VIII of FIG. 7.

Referring more particularly to FIG. 7, the outer portion 85 of the coupling device 86 is annular in shape and comprises a cam 93 on the inner surface thereof. The outer portion 85 is freely rotatably mounted on a shaft 94. The other half 95 of the one-revolution coupling device 86 is fixed on the shaft 94 and pivotally supports at 96 a pivot lever 97, which itself supports at one end a cam roller 98. A tension spring 99 is arranged between the other end of the lever 97 and a fixing point on the coupler half 95 and is arranged to urge the roller 98 in an outward direction for engagement with the cam 93. The pivot lever 97 further comprises a control arm 100 which is arranged for engagement with control means to be described.

Figure 4:
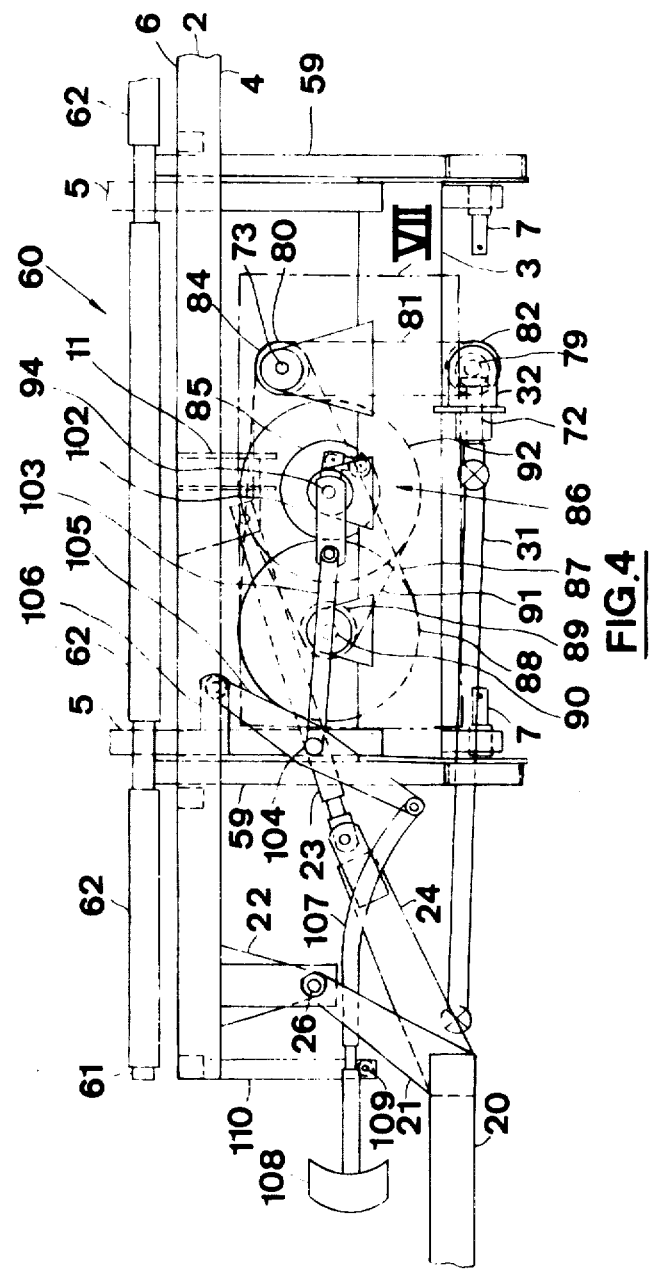
FIG. 4 is a partial sectional view on the line IV—IV of FIG. 2.
Figure 5:
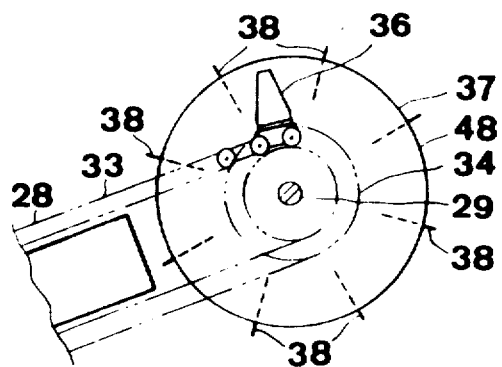
FIG. 5 is a partial sectional view, on a larger scale, on the line V—V of FIG. 3.

The shaft 94 supports a crank arm 102 and a link 103 is coupled at one end to the crank arm 102 and at its other end to a pivot point 104 intermediate the ends of a lever 105. The lever 105 is pivotally mounted at one end on a support 106 on the load bed framework 4 and at the other end on a plunger rod 107 of a plunger 108 (FIG. 4). The plunger rod 107 is supported in a generally horizontal position by a support roller 109 on a support 110 which are also seen in FIG. 4.

All the above described drive means are situated at a centralized location underneath the load bed surface and rearwardly of the tractor 12.

Figure 11:
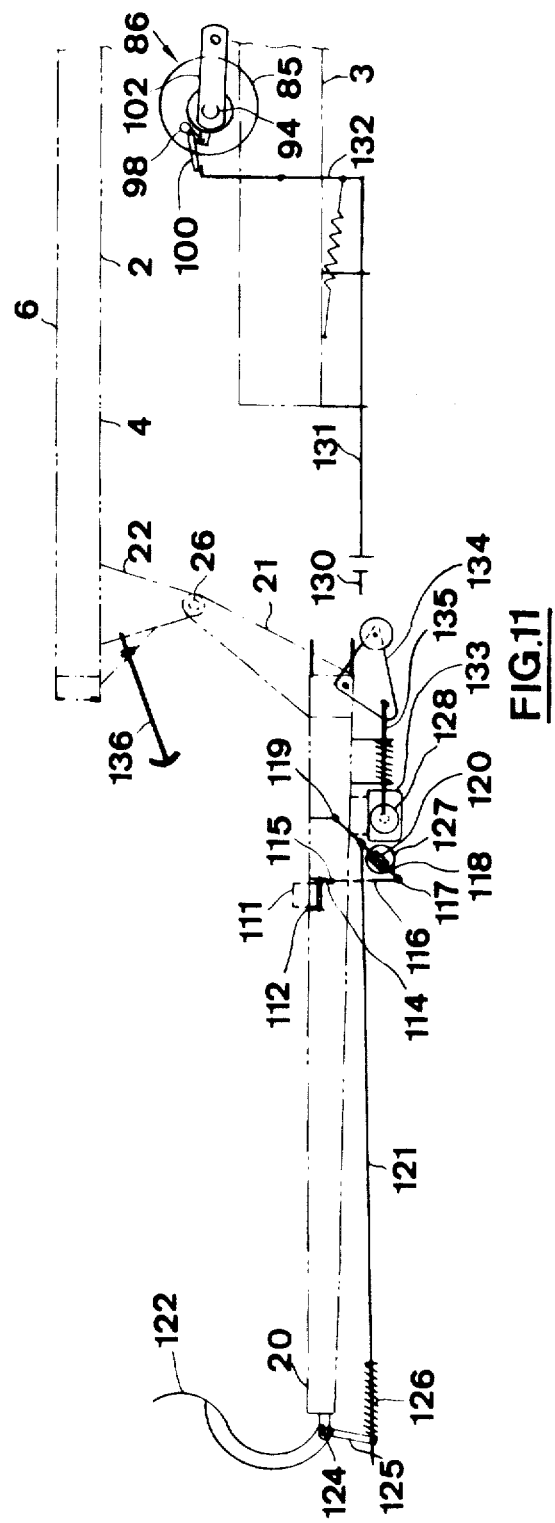
FIG. 11 is a view taken in the direction of arrow XI of FIG. 10.

The bale accumulator further comprises a plurality of control mechanisms and linkages. Referring to FIGS. 10 to 12, a first and fore-and-aft extending resiliently mounted control lever 111 is pivotally mounted at its forward end on the load table 20 at a location generally rearwardly of the pick up means 25 and in a manner so that in a rest position, the control lever 111 projects through an elongated aperture 112 in the load table 20 and is held proud of the upper surface of the load table by tension spring means; (not shown); this rest position being seen most clearly in FIG. 1. An arm 114 fixed at one end to the control lever 111 is coupled at its other end via a ball joint 115 to a link 116 which itself is coupled via another ball joint 117 to one end of a pivot lever 118. The pivot lever 118 is pivotally mounted via a ball joint 119 on the rear edge of the load table 20. The arm 114, the spring means, the link 116 and the pivot lever 118 are all located on the underside of the load table 20 so that they are not contacted by bales loaded on the load table. An extension 120 is fixed to the lever 118 intermediate its ends, together with a first push rod 121 which is pivotally connected to the lever 118. A second and resiliently loaded control lever 122 is pivotally mounted at the left-hand side of the load table 20 in a manner so that it projects from below to a location above and to the right of the left-hand side edge. A torsion spring 123 urges the lever 122 towards the right, i.e. inwardly of the load table. The second control lever 122 is secured to a pivot rod 124 which, via an arm 125 and a spring 126 is coupled to the push rod 121.

A second and third push rod 127 and 128 are slidably mounted on the underside of the load table 20 and are arranged to cooperate with the extension 120 on the pivot lever 118. The second push rod 127 is pivotally coupled to a rock member 129, which itself is pivotally coupled to a spring-loaded fourth push rod 130. The fourth push rod 130 is arranged so that when the load table 20 is in the bale-receiving position, it cooperates with a fifth push rod 131, the latter being slidably supported in a generally transverse direction on the underside of the load bed 6, and adapted to control the position of a spring loaded rocking lever 132, which in turn cooperates with the control arm 100 of the one-revolution coupling device 86. The arrangement is such that when in the rest position, the cam roller 98 is out of engagement with the cam 93. The third push rod 128 is coupled to a hydraulic valve 133 controlling the oil supply to, and discharge from, the hydraulic cylinder 23 between the load table 20 and the load bed 6.

A rocking member 134 is pivotally mounted on the load table 20 and pivotally supports at one end a spring loaded control pin 135. The other end of the rocking member 134 is arranged to contact a stop 136 on the load bed 6 when the load table 20 is raised to vertical transport or bale-discharge position. A further hydraulic valve 137 (FIG. 2) which can be actuated manually from the tractor seat, is arranged to control the position of the push-off mechanism 60.

Figure 13:
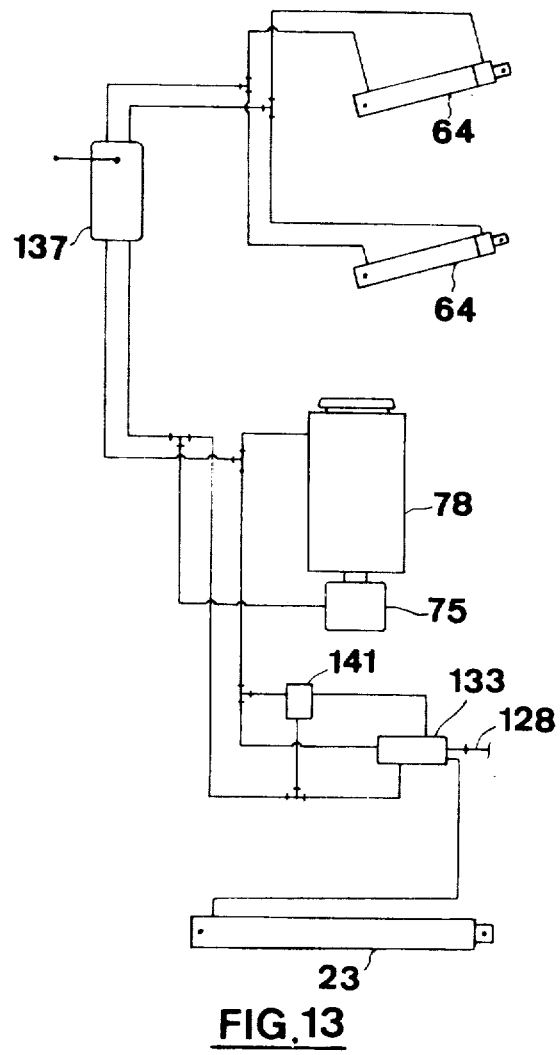
FIG. 13 is a circuit diagram of the hydraulics of the machine.

FIG. 13 illustrates the hydraulic circuitry for the bale accumulator. The hydraulic pump 75 supplies fluid under pressure to the valve 133 which is automatically actuated via the control lever 122 and the third push rod 128 when the load table 20 has been completely filled with bales 140. The valve 133 controls the pressure fluid supply to, and discharge from the load table lifting cylinder 23. The hydraulic pump 75 also supplies fluid under pressure to the valve 137 controlling the position of the push-off cylinders 64. The valve 137 is manually operable from the tractor seat. A pressure relief valve 141 in the pressure line between the pump 75 and the valves 133 and 137 protects the hydraulic system against overpressure.

OPERATION

With the bale accumulator 1 mounted on the tractor three point hitch 9, the universal joint shaft 71 coupled to the tractor PTO and the telescopic supports 44 retracted, operation of the accumulator can commence.

In operation, the bale accumulator 1 is moved in the direction 138 (FIG. 1) across a field with the load bed 6 and the load table 20 at a predetermined height above the ground and with the pick-up means 25 in the lowered position in which it bridges the gap between the ground surface and the load table 20. The pick-up means 25 contact the ground surface so that the skids 39 follow the ground contour which may result in the pick-up means 25 pivoting around the fore-and-aft extending pivot axis 41 as well as around the transverse horizontal pivot shaft 42. Power is supplied from the tractor 12 to the accumulator through the universal joint shaft 71, whereby the pump 75 supplies fluid under pressure to the valves 133 and 137 but as neither is actuated as yet, the pressure fluid is merely returned to the reservoir 78.

The upper course of the endless member 28 of the pick-up means 25 is driven in the direction 145 (FIG. 1) via the universal joint shaft 31 and in operation, the machine is driven so that bales 140 laying in the field are caught, from one end, between the forward ends of the side walls 27 of the pick-up mechanism 25. The bale-retainer fingers 36 grasp each bale 140 at the forward end of the endless member 28 and lift it from the ground and convey it in the direction 145 along the pick-up means 25. The bale transfer drums 37 at the discharge end of the pick-up means 25 lift the bale out of contact with the fingers 36 and throw it onto the load table 20 at a location adjacent the load table pivot axis and on top of the control lever 111 which is thus pushed downwards. This downward pivotal movement of the lever 111 results in the engagement of the one-revolution coupling or clutch mechanism 86 through the various linkages. More specifically, the lever 111 pulls on the rod 116, thereby pivoting the lever 118 around its pivot 119 and causing the extension 120 to push against the second push rod 127. The push rod 127 pivots the rocking member 129 and moves the fourth push rod 130 to the right against the action of a return spring. As the load table 20 is in the lowered position, the fourth push rod 130 pushes against a fifth push rod 131 thus causing the rocking lever 132 to pivot back, whereby the control arm 100 is released. The spring 99 pivots the lever 97 so that the cam roller 98 contacts the inner surface of the clutch half 85. As the clutch half 85 is continuously rotated at a low speed, the cam means 93 will contact the roller 98 and thus entrain the inner half 95 of the coupling device 86. Thereby the crank arm 102 is rotated through one revolution to cause, via the link 103 and the lever 105, the plunger 108 to be actuated over one cycle of extension and retraction. In this way, the bale 140 shown in full lines in FIG. 14 is moved to the left by the width of one bale to the position shown in FIG. 15. Simultaneously the lever 111, which was depressed by the bale 140, returns to its raised neutral position. This results in the rocking lever 132 returning to its rest position so that during the retracting part of the stroke of the plunger 108 (i.e. during the second half of the one revolution of the clutch mechanism 86), the rocking lever 132 again acts on the arm 100, against the spring 99, to disengage the roller 98 from the cam means 93. Thus, the clutch halves 85 and 95 are uncoupled, whereby the half 95 stops, whilst the half 85 continues to rotate.

The foregoing operation is repeated for the second and third bales 140 placed on the load table 20 (FIG. 16). During its second stroke, the plunger 108 shifts to the left the two bales loaded on the load table 20 over the width of one bale. During the third stroke of the plunger 108, three bales are shifted over the width of one bale to the left.

When three bales are loaded on the load table 20 and shifted to the left by the plunger 108, the second control lever 122 is pivoted to the left against the spring 123 by the bale loaded first on the load table 20. This causes the arm 125 to push the first push rod 121 to the right so that the pivot lever 118 is pivoted around the ball joint 119 away from the second push rod 127 and to a position rearwardly of the third push rod 128. This is possible because of the provision of ball joints 115, 117 and 119.

The fourth bale loaded on the load table 20 at a location rearwardly of the pick-up means 25 completely fills the load table 20 and depresses the lever 111 so that through the arm 114 and the link 116, the pivot lever 118 is pivoted to the extent that the push rod 128 is pushed in a forward direction, thus actuating the valve 133. Thus, upon the loading of a fourth bale on the table 20, the valve 133 is actuated rather than the one-revolution clutch mechanism 86. Thereby pressure fluid is supplied to the table lifting cylinder 23, whereupon the table is pivoted around the pivot 26 to the generally upright bale-discharge position shown in FIGS. 12 and 17. As the table pivots to its upright position, the row of bales loaded thereon is turned through 90° and deposited on the left-hand end of the load bed surface 6, underneath the bale-retainer means 18 which are lifted against the action spring 69. With the load bed empty, the load rack 15 is located at the left-hand end of the bed adjacent the load table 20, and during the pivoting movement of the table 20, the row of bales is pushed against the load rack which is thus shifted to the right against the action of the spring 54 over a distance corresponding to the width of the row of bales as seen transversely of the load bed. The extended spring 54 holds the loadrack 15 against the right hand side of the first row of bales to support the same. The slight inclination to the right of the bale-retainer frame 49 of the load rack 15 is intended to improve the stability of the stack of bales placed thereagainst during operation of the machine.

The resiliently-loaded bale-retainer means 18 acting on the top bale of the last row of bales placed on the load bed surface 6 also help to stabilise the stack of bales on the load bed. These retainer means 18 especially help to prevent the last deposited row of bales from falling back on the load table 20 when the latter is returned to its horizontal, bale-receiving position.

The stop 136 engages and pivots the rocking member 134 as the load table 20 reaches its bale-discharge position, whereupon the control pin 135 pushes the pivot lever 118 back to its original position rearwardly of the second push rod 127. This movement is against the action of the compression spring 126 and results in the push rod 128 being released and the valve 133 automatically returned to its neutral position, whereupon the table 20 is lowered. The bale-contacting end of the lever 122 is shaped so that when the table 20 is lowered, the lever 122 does not pull down the row of bales just deposited on the load bed surface 6. In other words the edges of the bale-contacting end of the lever 122 are all rounded so that the lever readily disengages the bales when necessary.

Figure 19:
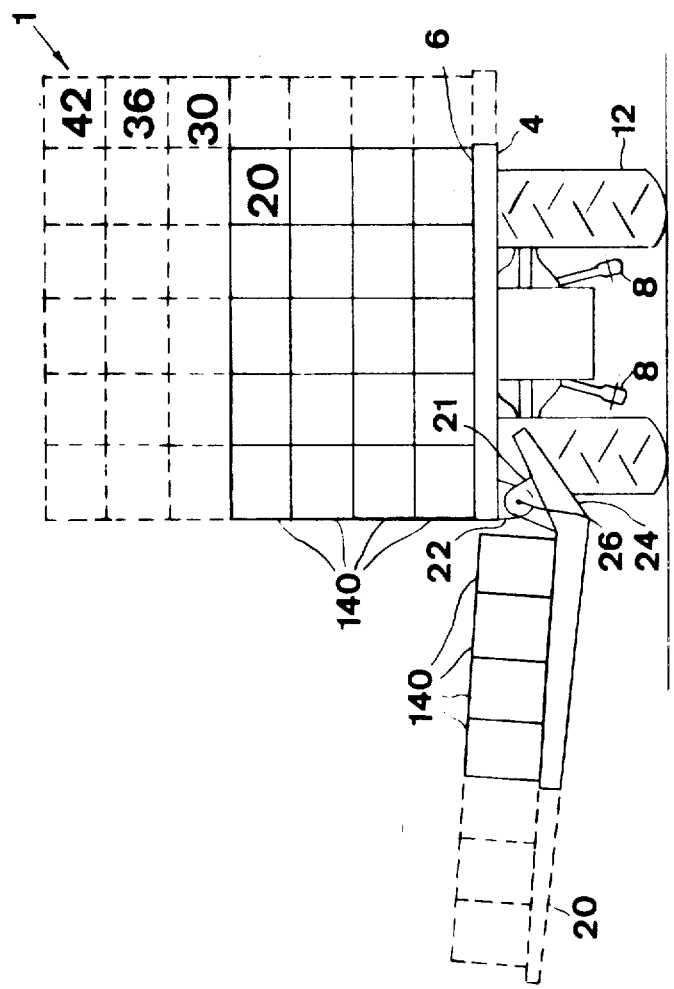

The loading of another row of four bales on the load table 20 can now be started. Each further row of four bales is deposited on the left-hand end of the load bed surface 6, thus pushing to the right the rows of bales already loaded on the load bed surface 6, together with the load rack 15. This progressive movement of the load rack 15 gradually increases the tension of the spring 54. This row-forming and row-loading operation is repeated until the load bed 6 is fully loaded, the number of rows of bales involved being dependent on the size of the load bed: FIG. 12 shows a four-row capacity load bed, FIGS. 14 and 17 a five-row and FIG. 19 a six-row capacity load bed. FIG. 19 also illustrates how a taller stack of bales can be formed by extending the length of the load table 20.

To unload from the load bed the stack of bales formed thereon, the load bed 6 is manoeuvered with respect to a trailer 139 so that its rear edge is adjacent an edge of the trailer as indicated in FIG. 18. The load bed rear edge is brought to the same level as the load platform of the trailer by means of the tractor hydraulics acting on the three point linkage 9. Thereafter, the operator actuates the hydraulic valve 137 from his tractor seat, whereupon the hydraulic cylinders 64 are extended and the push-off mechanism 60 is pivoted from the forwardmost rest position (broken lines in FIG. 18) to a rearward discharge position (full lines in FIG. 18) thus pushing the stack of bales in a rearward direction onto the trailer 139. The bale-contacting ends of the bale retainer means 18 are shaped with rounded edges so that these means do not interfere with this discharge operation.

As the push off mechanism 60 is pivoting to its discharge position, the tension of the spring 54 is at least partially relieved as one end thereof is coupled via the cable 55 to the push-off mechanism. This prevents the load rack 15 from being moved too abruptly to its initial position as soon as the stack is discharged. After the stack is unloaded, the push-off mechanism 60 is returned to its forwardmost position and the tension in the spring 54 is increased again by the push-off mechanism pulling on the cable 55 which is coupled to one end of the spring 54. Thus the load rack 15 is moved towards the left of the load bed 6 ready for receiving the first row of a new stack of bales. The push-off mechanism 60 and the load rack 15, and more especially the lowermost arm 70 of the latter, are shaped and positioned relative to each other so that they will not interfere with each other during operation of the machine.

After the push-off mechanism 60 and the load rack 15 have returned to their initial positions, the load table lowered, and the pick-up mechanism 25 brought to its operative position, loading of a further stack can start.

If the accumulator with a stack of bales on the load bed 6 has to be moved a long distance before unloading the stack, it is preferred to keep the load table 20 in the upright position. In this way, stress on the table suspension is minimised, the overall width of the machine minimised and the load table 20 helps to support one end of the stack of bales. Also the pick-up means 25 are preferably placed in the raised position for transport.

From the foregoing it will be seen that a bale accumulator in accordance with the present invention may be of the tractor-mounted type and is simple in construction and hence relatively cheap to manufacture so that it is a viable proposition for small and medium size farming operations and avoids the otherwise laborious and time-consuming bale collecting and loading tasks. An accumulator according to the invention does not reduce the capacity of a baler because the accumulator is worked independently of the baler. Operating the accumulator is very easy and it can handle any number of bales depending on the size of the machine, a formed stack of bales being readily off-loaded onto any flat-bed, trailer or truck. Thus a relatively large number of bales are stacked within the confines of the machine which is due to some extent to the fact that the bales are stacked with their longer dimensions in the operative direction of the machine, as opposed to being stacked with their larger dimensions in a transverse direction as is common practice on automatic bale wagons.

Also no restacking of the bales on the trailer load bed is required and subsequent mechanised handling, such as unloading from the trailer and depositing in a storage space, is conveniently possible. An accumulator according to the invention thus combines the following functions: picking up bales from the ground, stacking the bales in an orderly pattern, and depositing the stacked bales on a truck or trailer. No further specialized equipment is required for the handling of the bales between the stage of actual baling and transportation of bales to a storage area.

An accumulator according to the invention can handle bales of any size and any mixture of sizes without undue bale-feeding problems. In operation, the bales are positively lifted from the ground immediately on engagement by the fingers 36 of the bale pick-up means 25 so that the bales are not pushed over the ground in front of the loading table before being picked up. Also the pick-up and load table loading means positively position the bales on the load table and when placed on the load bed, the bales are positively held thereon so that the stack does not disintegrate due to the bouncing of the machine over uneven ground, for example.

As the pick-up mechanism is situated close to the tractor rather than at the outermost end of the load table, the off-set loading of the tractor and the suspension of the accumulator on the latter are kept to a minimum. This is also advantageous in that the rocking and bouncing of the load table and the pick-up means due to the movement of the tractor across uneven ground is kept at a minimum.

The relationship of the various components relative to each other, and especially the mounting of the pick-up means adjacent the pivot means of the load table, has enabled the various drive means to be centralised to the greatest possible extent at a location rearwardly of the tractor. Thus drive means are short and hence relatively inexpensive. Furthermore, several drive means are of the less expensive mechanical type as opposed to the more expensive hydraulic type.

The transport width of the accumulator does not exceed substantially, as often is the case in known devices, the width of the load bed. This is due to the pivotal mounting of the load table, and the feature that in the transport position the load table is in an upright position. Thus, the pick-up and load table do not take much "dead" space when in the transport position.

MODIFICATIONS

It will be clearly understood that for use in combination with tractors equipped with suitable hydraulics, the hydraulic pump 75 and reservoir 78 and the drive means therefore may be omitted. The hydraulic equipment would thus be simplified and the cost of the machine accordingly.

Figure 20:
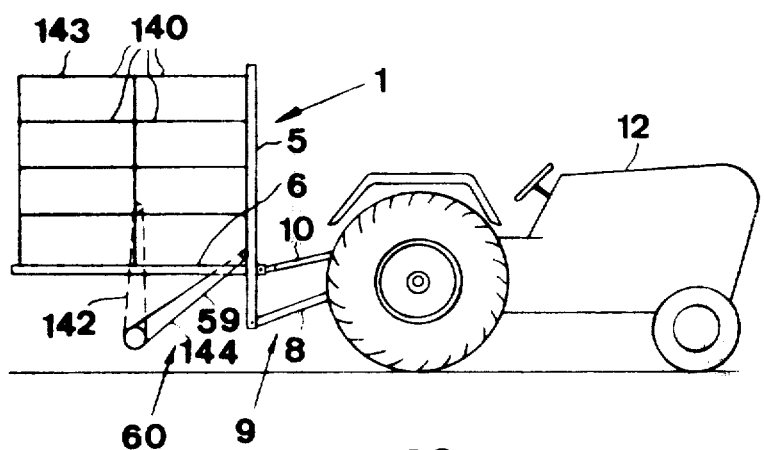
FIGS. 19 and 20 illustrate schematically respective modified accumulators.
Figure 6:
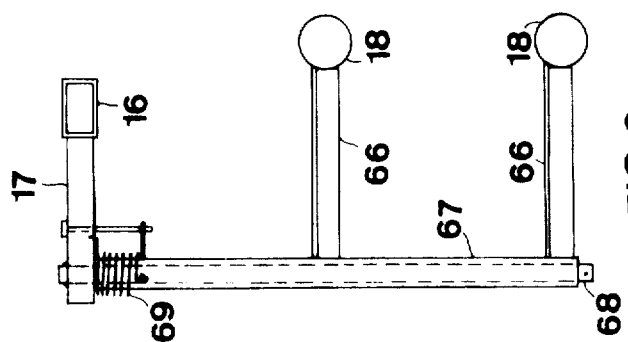
FIG. 6 is a partial top view, on a larger scale, taken in the direction of arrow VI of FIG. 1.

The machine described above in relation to FIGS. 1 to 18 can form stacks of bales with only one layer of bales when seen in the fore-and-aft direction. However, a machine for forming stacks with a plurality of layers in said direction is equally possible without departing from the invention. Basically all that is required is for the load bed to be extended in the fore-and-aft direction in accordance with the desired number of layers in a stack, and to reshape and reposition the push off mechanism 60. The push-off mechanism 60 then has an additional function, namely the rearwardly feeding and positioning of the successively formed layers on the load bed 6, in addition to its stack-discharge function. FIG. 20 illustrates a machine for producing a two-layer stack. When the first layer has been formed, the push-off mechanism 60 is actuated over half its full stroke, whereby it moves to a middle position 142, thus pushing the first layer of bales to the position indicated at 143. Thereafter the push-off mechanism 60 is retracted to its rest position 144 so that the formation of the second layer of bales can take place. The push-off mechanism is then moved over its full stroke to unload the twin layer stack all at once.

It further may be desirable to relieve the load on the tractor by making the accumulator "semi-mounted" by providing one or more ground-engaging wheels at the rear of the accumulator.

As already mentioned, FIG. 19 illustrates how the load capacity of the accumulator can be increased. The machine shown in full lines produces stacks of twenty bales (four high and five wide) but by lengthening the load table 20 by the width of one, two or three bales, and widening the load bed surface 6 by the depth of one bale, a machine is provided for producing stacks with respectively thirty, thirty-six and fourty-two bales (six wide and five, six or seven high). If in addition thereto, the length of the load bed 6 is doubled, as is shown in FIG. 20 and described above, then stacks with respectively sixty, seventy-two and eighty-four bales may be formed.

The invention has been described and illustrated as a fully tractor-mounted or "semi-mounted" machine. However, the invention is equally applicable to pull-type bale accumulators.

The load table 20 as described above is formed basically by a flat load surface. It may prove desirable to provide an upstanding rear edge on this load surface to assist in the proper alignment of the bales loaded thereon.

The pick-up means 25 may be resiliently mounted so as better to follow the contour of the ground surface. The pick-up means 25 also may be pivotally mounted on the load table 20, adjacent the pivot thereof, as opposed to being pivotally mounted on the load bed framework 4. Furthermore, it is possible to mount the pick-up means 25 on the frame-work in a manner such that the pick-up means may be pivoted to a transport position within the width of the load bed.

Whilst the illustrated embodiment is of relatively simple construction, further simplification can be achieved by reducing the number of mechanical linkages employed to effect the desired sequence of operation. This can be done by employing electrical components.

Having thus described the invention, what we claim is:

1. A bale accumulator comprising:
   a load bed for holding bales thereon,
   a load table pivotally mounted to one side of the load bed at the lower end thereof and movable between a horizontal bale-receiving position transverse of the load bed and proximate to the ground, and an upright bale discharge-position for depositing a row of bales on the load bed,
   drive means for pivoting the load table from the bale-receiving position to the bale-discharge position and vice versa,
   first bale-transfer means for moving bales received on the load table in a direction transversely away from the load bed for the formation of a row of bales on the load table,
   a bale pick-up means located forwardly of the load table adjacent the pivotal mounting thereof and bridging the gap between the ground and the load table for picking up bales from the ground and depositing the bale one after the other on the load table for forming a row of bales thereon.

2. The bale accumulator of claim 1 wherein the first bale-transfer means comprise a plunger driven by a one-revolution coupling mechanism.

3. The bale accumulator of claim 2, wherein the one-revolution coupling mechanism comprises a clutch having two cooperable portions, one portion being provided with a cam and, in use, continuously rotated, and the other portion being provided with a cam follower which is releasably engageable with the cam.

4. The bale accumulator according to claim 3, wherein the one-revolution coupling mechanism is actuable by first control means located on the load table and engageable by a bale being loaded thereon by the pick-up means.

5. The bale accumulator of claim 4, wherein the first control means comprise a lever pivotally mounted on the load table operable to actuate the one-revolution coupling mechanism through a mechanical linkage system.

6. The bale accumulator of either claim 4 or 5 further comprising second control means operable to engage the drive means for pivoting the load table from the bale-receiving position to the bale-discharge position, when a full row of bales has been formed on the load table, whereby that row of bales is deposited on the load bed.

7. The bale accumulator of either claim 4 or 5 further comprising second control means operable, when a full row of bales, except for the last bale of that row, has been accumulated on the load table, to relate the first control means to the drive means so that when the last bale of the row of bales is received on the load table, the first control means actuates the drive means, for pivoting the load table from the bale-receiving position to the bale-discharge position whereby the row of bales accumulated on the load table is deposited on the load bed.

8. The bale accumulator of claim 7, wherein the second control means comprise a lever pivotally mounted at one end of the load table remote from the load bed and positioned so as to be engageable by the first-loaded bale of a row of bales.

9. The bale accumulator of claim 8 wherein the drive means for pivoting the load table comprise a hydraulic cylinder.

10. The bale accumulator of claim 1 also comprising a movable rack mounted on the load bed, the movable rack being engageable by the first row of bales of a stack of bales to be loaded on the load bed from the load table, and movable transversely of the load bed as this row and further rows of bales are loaded onto the latter, the rack remaining in engagement with said first row of bales.

11. The bale accumulator of claim 10 wherein the rack is mounted on rollers for movement back and forth across the load bed.

12. The bale accumulator of claim 11, also comprising resilient means which are coupled to the movable rack and which are tensioned as rows of bales are placed on the load bed, said resilient means cause the movable rack to return to its initial position as the stack of bales is discharged from the load bed.

13. The bale accumulator of claim 12 also comprising second bale-transfer means operable to discharge a stack of bales formed on the load bed, and the resilient means which are coupled at one end to the movable rack, being coupled at the other end to the second bale-transfer means in a manner to reduce the tension in the resilient means during actuation of the second bale-transfer means.

14. The bale accumulator of claim 1 wherein the pick-up means is floatingly mounted on the load bed for pivotal movement around a first axis extending transverse to the direction of operative travel of the accumulator and around a second axis extending generally in the direction of operative travel.

15. The bale accumulator of claim 14 wherein the first and second pivot axis of the pick-up means are situated at one side of the pick-up means.

16. The bale accumulator of claim 15 wherein the end of the pick-up means remote from the load table is engageable with the ground to slide thereover and follow the contours thereof.

17. The bale accumulator of claim 1 also comprises second bale-transfer means operable to discharge a stack of bales formed on the load bed.

18. The bale accumulator of claim 17 wherein the second bale-transfer means is further operable sequentially to position a first layer of bales after receipt on the load bed of a plurality of rows of bales from the load table and then position at least a second layer of bales on the load bed after receipt of a second plurality of rows of bales from the load table to thereby form a multilayer stack on the load bed.

19. The bale accumulator of claims 17 or 18 wherein the second bale-transfer means further comprises a pivotal member operable to engage the bottom bales of the forwardmost layer of bales in a stack and to push the stack rearwardly off the load bed.

20. The bale accumulator of claim 19 wherein the pivotal member comprises rollers engageable with the bales.

21. The bale accumulator of claim 17 also comprising bale-retainer means above the load bed, the bale retainer means being operable to releasably engage in turn the upper bale of each row of bales deposited on the load bed by the load table to prevent bales from falling back on the load table in a transverse direction on the one hand and to permit discharge of a stack of bales in a rearward direction on the other hand.

22. The bale accumulator of claim 21 wherein the bale retainer means are resiliently urged into engagement with said upper bale and comprise bale contacting surfaces with rounded edges for not interfering with the discharge operation.

23. A bale accumulator comprising:
(a) a chassis;
(b) a load bed mounted on the chassis and adapted for holding a plural number of orderly arranged vertical rows of bales;
(c) a load table mounted to one side of the load bed at the lower end thereof for forming rows of bales thereon;
(d) pivot means for pivotally mounting the load table relative to the load bed, the load table being movable between a generally horizontal bale receiving position closely above the ground level and at a location transversely of the load bed, and a generally upright bale discharge position;
(e) bale pick-up means located forwardly of the load table adjacent the pivotal mounting thereof when the latter is in the bale-receiving position; the bale pick-up means being adapted to pick-up bales from the ground and depositing said bales one after the other on the load table;
(f) bale transfer means adjacent said one end of the load table and operable to transfer bales received on the load table in a transverse direction away from the load bed to form a row of bales on said load table;
(g) first control means associated with the load table and actuatable by any bale received on the load table for energizing the bale transfer means; and
(h) further control means associated with the load table for energizing the pivot means when a row of bales is completed on the load table for pivoting the latter to its upright position for depositing the row of bales formed thereon on the load bed.

24. The bale accumulator of claim 23 adapted to be mounted on a tractor three point hitch.

25. The bale accumulator of claim 23 comprising at least a pair of ground engaging wheels and adapted to be coupled to a tractor, the arrangement being such so that the bale accumulator is of the semi-mounted type.

26. A bale accumulator adapted to be mounted to a prime moving vehicle and cooperative with a load receiving vehicle having a load receiving surface comprising:
(a) a frame mountable to a towing vehicle;
(b) bale pick-up means fastened to the frame for picking up bales from the ground;
(c) a load table pivotally mounted to one side of the frame and movable between a horizontal position in bale receiving relation relative to the pick-up means fastened to the frame, to receive bales from the pick-up means and an upright bale discharge position for depositing bales collected thereon;
(d) first bale transfer means for moving bales received on the load table in a direction away from the pivotal mounting of said load table on the frame for the formation of a row of bales on the load table;
(e) a load bed fastened to the frame adjacent the load table transversely offset therefrom to receive successively rows of bales from the load table to form a stack thereon; and
(f) further bale transfer means movably attached to the frame and effective to be able to transfer the stack of bales from the load bed to the load receiving surface.

* * * * *